United States Patent [19]

Hart

[11] Patent Number: 4,793,046

[45] Date of Patent: Dec. 27, 1988

[54] METHOD AND APPARATUS FOR PRECISION INSTALLATION OF PIANO HAMMERS ON PIANO ACTIONS

[76] Inventor: Wendell D. Hart, 417 Main, P.O. Box 1567, Grand Junction, Colo. 81501

[21] Appl. No.: 854,304

[22] Filed: Apr. 21, 1986

[51] Int. Cl.[4] ............................................. B23P 19/04

[52] U.S. Cl. ....................................... 29/253; 81/419; 81/426; 81/352

[58] Field of Search ................. 29/244, 253, 238, 239, 29/246, 426, 5; 81/418, 419, 424.5, 426, 426.5, 352; 144/29

[56] References Cited

U.S. PATENT DOCUMENTS

| | | | |
|---|---|---|---|
| 1,038,745 | 9/1912 | Gregg | 81/352 |
| 2,700,910 | 2/1955 | Van Niel | 29/253 |
| 3,055,244 | 9/1962 | Snook | 81/426.5 |
| 3,689,977 | 9/1972 | Crabbe | 29/253 |

*Primary Examiner*—Frederick R. Schmidt
*Assistant Examiner*—Blynn Shideler
*Attorney, Agent, or Firm*—B. Deon Criddle

[57] ABSTRACT

Method and apparatus for piano head setting device wherein a glue remover is provided to remove glue collars from interconnected hammer shanks and hammer heads, a knuckle remover is provided to lift the shank knuckles from their mortises in the hammer shanks, and a piano hammer head setter is used to set the orignal shape of a hammer to be repaired and to assemble a repaired or replacement hammer to the set shape so that the hammer head of the replacement hammer will strike the piano wire in the same manner as the original.

3 Claims, 3 Drawing Sheets

METHOD AND APPARATUS FOR PRECISION INSTALLATION OF PIANO HAMMERS ON PIANO ACTIONS

BACKGROUND OF THE INVENTION

1. Field of the Invention

This invention relates to striking hammers used in pianos to strike the strings of the piano. It is particularly concerned with providing means for exactly positioning the hammer head on a shank so that when the hammer head is mounted on the action rail in the piano, the exact striking point of the hammer head will contact the string at its critical node, and insure that each hammer head will rise to strike its strings and do so without any side-to-side movement or scooping motion.

2. Prior Art

It has long been recognized that it has been necessary to be able to replace striking hammer heads of a piano's and to have the replacement hammer heads perform in the same manner as the original hammer heads after their installation on the action's flange rail and placed back in the piano for operation. The installed hammer heads wear and occasionally break; and if piano quality is to be maintained, the replacement hammer heads must be properly aligned and fitted on their shanks so that the striking points thereof will properly engage the strings of the piano at their critical nodes and at predetermined angles with reference to the X, Y, and Z coordinate axes. The axis of rotation must always be parallel the flange rail.

In replacing the striking hammer heads, it has been common in the past to utilize the old hammer heads being replaced as guides, to visually set the replacement hammer heads in respect to their shanks so as to provide replacement hammer heads having the same pitch, side angle and travel accuracy of the hammer heads being replaced. This has generally been done through trial and observation techniques and visual judgment, as is more fully explained in the articles entitled "Grand Hammer Hanging", by Cliff Geers beginning at page 12 of the May, 1984, *Piano Technician's Journal,* and "Traveling Hammers", by Jack Krefting, beginning on page 11 of the March, 1985, issue of the *Piano Technician's Journal.*

OBJECTS OF THE INVENTION

Principal objects of the present invention are to provide a method and apparatus that can be used to actually determine the pitch, side angle and travel accuracy of a hammer head to be replaced and then to precisely set said pitch, side angle and travel accuracy of replacement hammer head with respect to the shank of the hammer and its mounting flange.

Other objects are to provide method and apparatus for preparing the hammer shank to receive the hammer head and for precisely positioning the hammer head on the shank during gluing of the hammer head to the shank.

Still other objects are to provide a device that is readily used even by unskilled persons and that eliminates the guesswork in properly setting hammer heads for use on pianos.

FEATURES OF THE INVENTION

Principal features of the invention include the full removal of the knuckle from a hammer shank, removal of a hammer head to be replaced, removal of all old glue from the shank and exact positioning of a new hammer head and knuckle on the shank.

Other features of the invention include a knuckle extractor and insert-press, a glue remover and a head stock holder that is adapted to receive and securely hold a hammer head, whether a hammer to be replaced or a replacement hammer and to securely hold the said hammer while a shank is mounted thereto. The holder includes a head stock assembly, and a head stock plate inscribed with protractor gauge settings, arranged to cooperate with a shank holding guide to set a precise angular relationship between a hammer head and a shank on which the hammer head is to be mounted.

Other features include the use of locking screws to secure the position of the shank holding guide relative to the head stock and screw means to drive the shank into the hammer head after the precise angular relationship has been determined and set.

Other objects and features of the invention will become apparent from the following detailed description and drawing, disclosing what are presently contemplated as being the best mode of the invention.

THE DRAWINGS

In the drawings:

FIG. 1 is a perspective view of a glue remover of the invention;

FIG. 2, a side elevation view of the glue remover of FIG. 1;

FIG. 3, a perspective view of a knuckle extractor and insert-press of the invention;

FIG. 4, a side elevation view of another embodiment of knuckle extractor partially broken away for clarity;

FIG 5, a perspective view taken from above and the front showing the holder of the invention with a hold-down clamp and cover, a head stock assembly and a V-grooved guide block shown exploded from the remainder of the view;

FIG. 6, a top plan view of the device shown in FIG. 5; and

FIG. 7, another perspective view, also showing the clamping means and head stock cover, as used for attachment to the head stock assembly.

DETAILED DESCRIPTION

Figure 1:
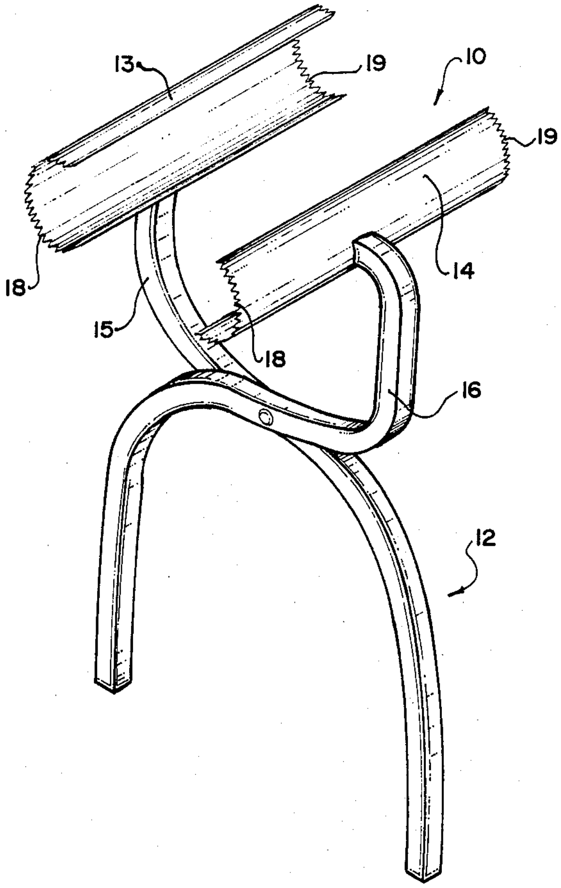
Figure 2:
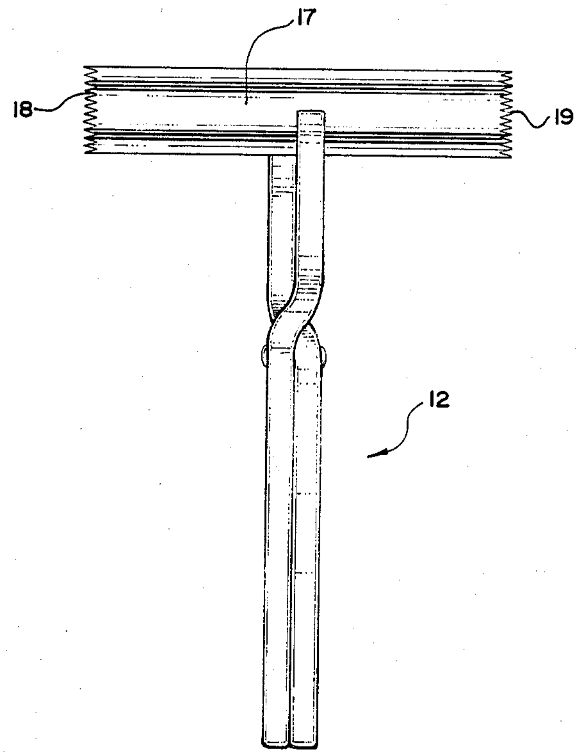
Figure 3:
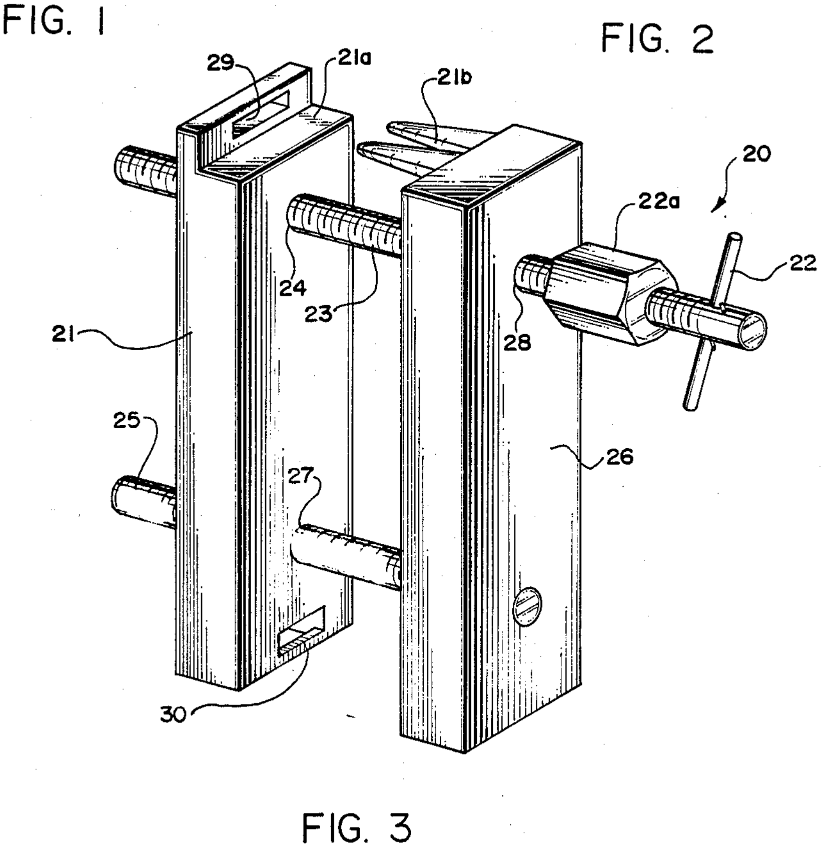

Referring now to the drawings:

The present invention comprises a method and apparatus for the precision installation of piano hammers piano actions It is well recognized that piano hammers will wear with use and deteriorate with time The hammer heads are generally made of a felt material and repeated striking of a taut wire by the felt material will cause the material to wear. Atmospheric conditions, i.e. temperature and humidity, can also adversely affect the hammers. In any event, it becomes necessary from time to time, to remove the hammers and to replace them with new hammers. In a complete hammer assembly a knuckle, also made of felt, buckskin or the like, is mounted to extend from the hammer shank base and this knuckle often must be replaced. In the past removal of the hammer shank knuckle has frequently resulted in damage to the hammer shank base and/or to the mortise in the hammer shank base in which the knuckle is positioned. If the mortise is damaged it is difficult, at best, to mount a replacement knuckle and the entire shaft may have to be discarded. Since replacement shafts may not be the same as the original, it becomes even more difficult to properly mount a hammer thereon. Also, since the same work may have been done many times previously it may be necessary to duplicate or correct discrepancies resulting from previous faulty workmanship on the piano.

In removing a hammer to be replaced from a hammer shank it is generally necessary to remove all hardened glue from the hammer shank and any collar of glue built up adjacent to the hammer head at the hammer head base.

In practicing the method of the invention a worn hammer assembly, including a hammer head needing replacement, hammer shank with knuckle, and a flange assembly is removed from a piano action. The worn hammer assembly is placed in a holder and is immobilized. The relationship of the components of the hammer assembly are identified and marked by the holder and the hammer assembly is removed from the holder after the angular guide settings have been set. Thereafter the worn hammer head is removed from the hammer shank. The knuckle is also removed without damaging the hammer shank mortise, and the hammer shank is rebuilt by inserting and gluing in a new knuckle and by positioning and installing a new hammer head thereon at precisely the position previously identified and marked by the holder.

The glue is removed from the hammer shank using a glue removal tool 10, comprising pliers 12 with half-tubular segments 13 and 14 respectively fixed to opposite jaws 15 and 16 thereof so that when the jaws are brought together the segments close to form a continuous, straight tubular member 17.

Notched teeth 18 are formed in one end of the tubular member, with the teeth cut to project to a common plane normal to the axis through the tubular member. Notched teeth are formed the opposite end of the tubular member with the teeth 19 cut so that the tips thereof are angled other than at ninety degrees with respect to the tubular member axis.

In use, the plier handles are manipulated to open the jaws 15 and 16. The hammer shank is positioned in one of the segments with either teeth 18 or 19 adjacent to the hammer head and in engagement with the usual glue collar surrounding the shank at the head. The jaws are closed and turned around the shank to cause the teeth to cut and remove the hardened glue. The choice of using teeth 18 or teeth 19 is dependent upon the glue collar and the degree of the angle of the hammer head. In some cases one set of teeth work better and in other cases the other set works best. In any event once the glue collar has been removed the hammer head can be pulled off without breaking the shank as commonly happens when the old glue collar is not fully removed before use of a hammer head extractor. The shank is also now glue free, ready for installation of a new hammer head.

If it is necessary to remove and replace the shank knuckle this is preferably done using the knuckle removal tool 20. The tool 20 includes a shank holder 21 with a shelf 21a on which the shank is positioned so that a bifurcated lift blade is aligned to straddle the core of the knuckle, beneath the rounded portion of the knuckle. The lift blade is then forced beneath the rounded portion by turning handle 22 that is fixed to and rotatable with a screw shaft 23 that is threaded into a bore 24 through the shank holder 21. A spacer sleeve 22a on the screw shaft 23 permits turning of the handle. As the bifurcated blade moves forward and below the rounded portion of the knuckle base the shaped blades which have inner edges increasing in thickness from the outer end of the blade, wedge between the shank and the knuckle roller felt to lift the knuckle from its mortise in which it has been glued. A rod 25 projects from blade carrier 26 and through a port 27 in the shank holder to guide the blade and the blade carrier. The threaded screw shaft 23 also serves as a guide in passing freely but closely through a port 28 in a blade carrier 26. The knuckle is thus easily removed without first cutting the knuckle away and then cutting the core or insert into the mortise so that it can be removed in piecemeal fashion as has been previously done. A slot 29 in an upright back of the shank holder receives the blade and keeps the blade from veering as the knuckle is removed.

In replacing the knuckle a new knuckle is placed in a semi-circular notch 30 in the shank holder. The mortise in the hammer shank base is positioned t receive the insert flange of the knuckle and the handle 22 is operated to close the blade carrier 26, thereby compressing the shank holder between the shank holder and the blade carrier and forcing the insert flange of the knuckle into the mortise provided therefore in the knuckle's hammer shank base. The new knuckle insert is thus press fitted with fresh glue and the hammer shank itself is ready to be press fitted into a new hammer head.

Figure 4:
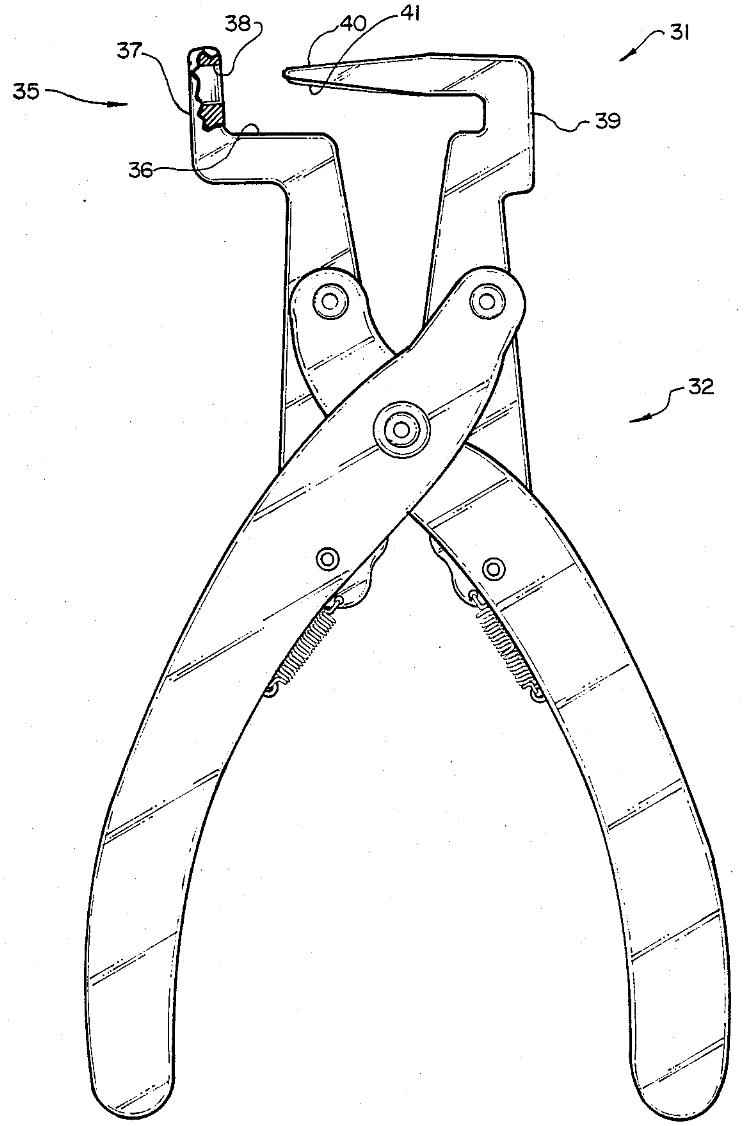

As best shown in FIG. 4, another embodiment of knuckle remover 31 uses compound leverage type pliers 32, with a straight line, parallel jaw movement. Such pliers, are well known. In the present instance, the shank holder 35 having a shank support shelf 36, and upright portion 37, and a slot 38 through the upright portion, is affixed to one of the jaws. In addition, a blade assembly, including a support 39 and bifurcated blades 40 and 41 arranged in side-by-side relationship and adding a wedge lifting surface, with a decreasing wedge space between the blades, is attached to the other jaw of the pliers 32. In use, a hammer shank is positioned on the shelf 36 such that when the handle of the pliers are squeezed the blades straddle the insert of the knuckle and move beneath the knuckle base and enter into the slot 38. Continued squeezing of the handles will move the blades further beneath the knuckle and will progressively lift the glued knuckle insert from its mortise in the hammer shank base.

Figure 5:
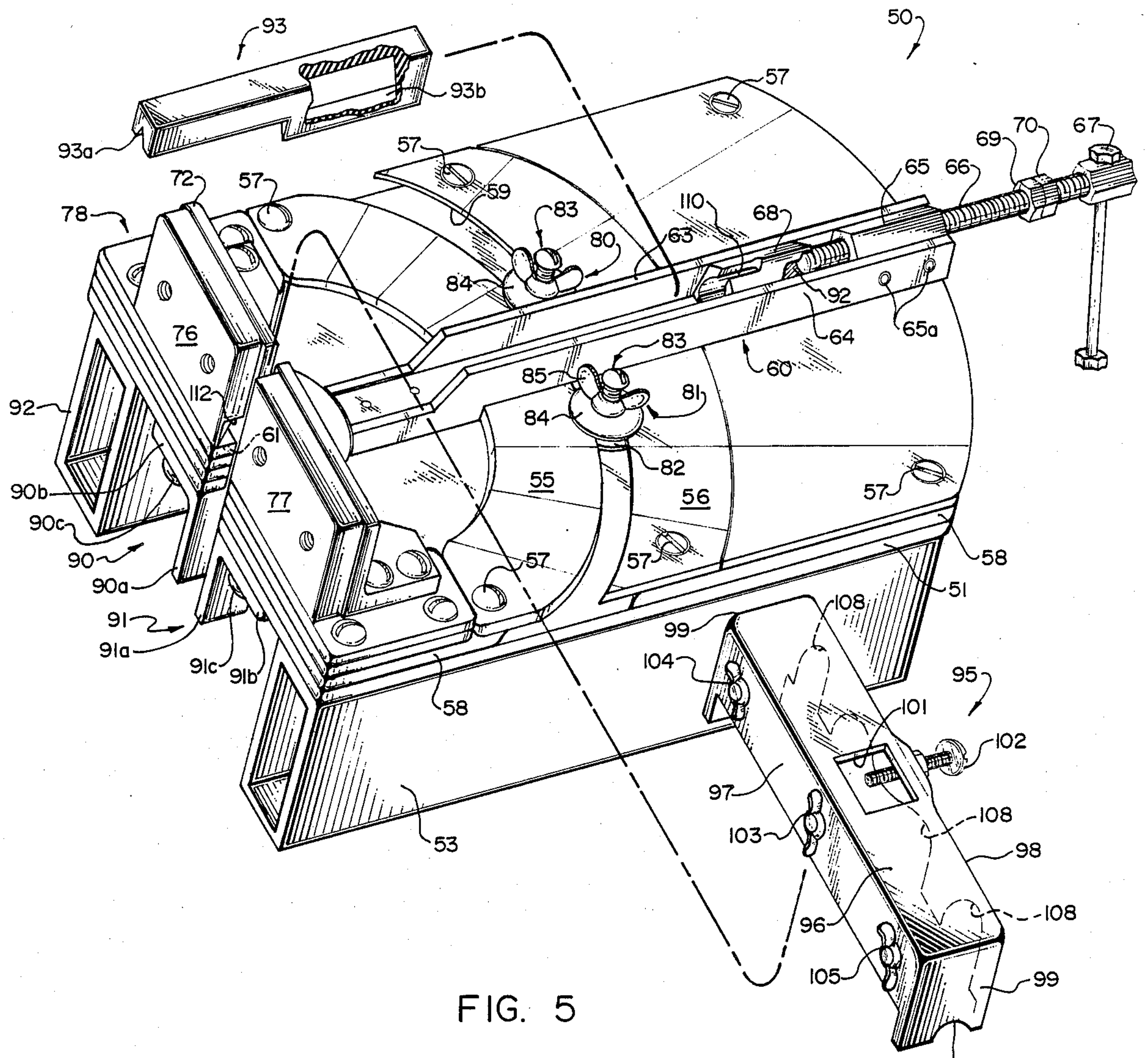
Figure 6:
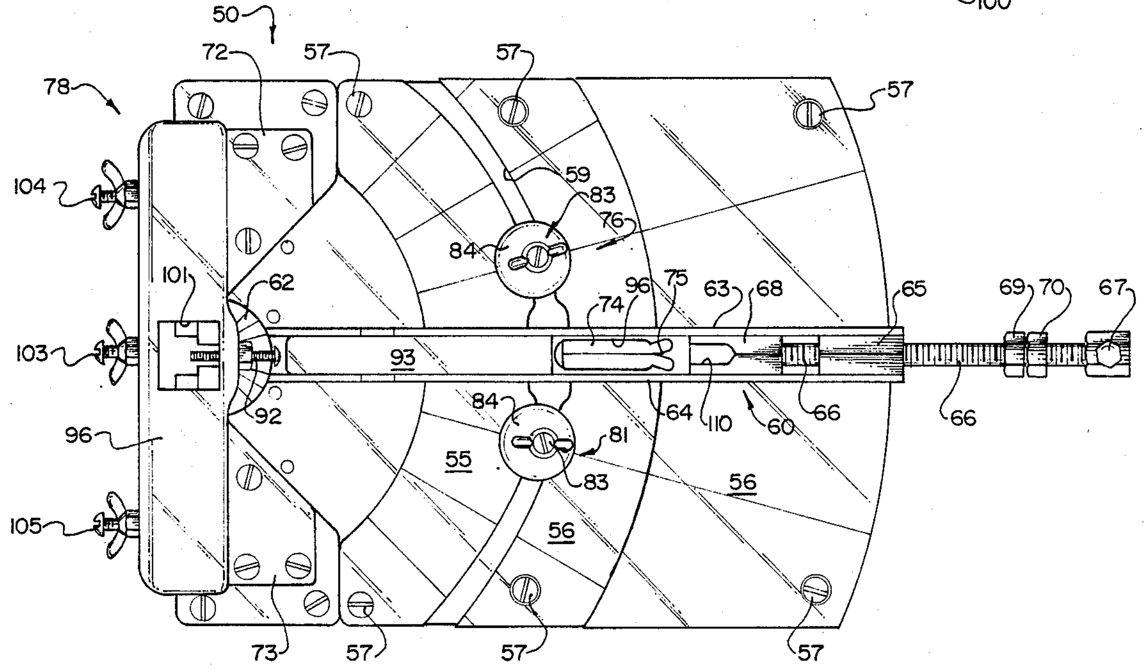

As shown best in FIGS. 5-7 a piano hammer head setting device 50, is used to properly position the piano hammer head on the hammer head shank. Using the piano hammer head setter, a piano technician can readily install hammers "four-square" to the striking point, from any radial degree and angle. The striking point of each hammer head can be installed to properly strike its strings at their critical nodes, whether mounted in a straight, curved, or lateral alignment. This angles alignment is predetermined with reference to the X, Y, and Z coordinate axes and avoids the probability of a parallactic misjudgment of angle by the eye. With the setter of the invention, hammer head shanks can be press fitted to the hammer head bore with set accuracy for straight or oblique or curved alignment of hammer heads to hammer shanks and also allows for easy determination of the accurate cut-off length of the shank ends.

Also, with the setter of the invention, hammer shanks and hammer heads may be set to the original action and keyboard geometry laid out by the accuracy of the "scale stick" and the established "striking line". That is, it is possible to set the hammer shanks and hammer heads to the original piano specifications of the scale designer. Alternatively, with the setter of the invention, it is possible to duplicate or correct discrepancies from the original specification and to accommodate side angle, pitch, and flare of the hammer head, for and aft, that have become necessary as a result of previous work on the instrument.

The ninety degree of vertical rise of hammer shank travel, from a rest position to striking contact of the hammer head to the string, is achieved with virtually no flange shiming necessary to correct faulty hammer shank and hammer head travel. The hammer shank and hammer head combination is set to travel to the square and the necessity of shiming flanges for proper alignment is kept to an absolute minimum usually done only to correct minor flaws in the original manufacture of the mounting flange and center pin alignment, or bushings thereof. Use of the setter of the invention also keeps the necessity of hammer tailed tapering to a uniform minimum, especially in the slanted or angled sections of the playing action mechanism, where tapering of tails is critical for proper travel, checking, and clearance. If it is necessary to remove excess weigh from the hammer head material it can be removed in those areas of the hammer felt and molding not critical to retaining a neat and professional appearance in the hammer line.

The piano hammer head setter 50 comprises a base plate 51 supported by a pair of legs 52 and 53, on the bottom thereof and at opposite sides of the plate 51. A pair of arcuate plates 55 and 56 are attached to plate 51 by screws 57 and are held spaced slightly above the plate 51 by spacer plates 58. A channel 59 is thus formed between the plates 55 and 56, allowing for swivel adjustment of a shank channel guide 60.

A hammer shank channel guide 60 is adapted to pivot as if turned about a point 61 at one end thereof of the plate 51. The pivoted end of the channel guide projects from beneath a semi-circular plate 62 that is marked with radiant, protracted lines, which lines are also projected outwardly onto the plates 55 and 56. The channel guide 60 has upstanding walls 63 and 64 that are spaced apart and an elongated nut 65 is fixed in the other end of the channel guide. This elongated nut 65 is fixed in position by counter-sunk "allen" screws 65. The screws 65*a* keep the nut secured in alignment with the channel guide 60. A shaft 66 is threaded through the elongated nut 65 and has a handle 67 on one end to provide for turning of the shaft 66 and pushing of the press-rod block 68 on the other end thereof. A pair of nuts 69 and 70 are also threaded on shaft 66 to provide limit stops that can be set to limit travel of shaft 66.

A pair of adjustable hammer head guide block mounts 72 and 73 are provided at the end of plate 51 adjacent to the invisible pivot point 61.

The radiant protracted lines on the arcuate plates 55 and 56 allow the shank channel guide 60 to be accurately angularly positioned with respect to an opening 74 in the bottom of the shank channel guide 60 between the upstanding walls 63 and 64. An indicating arrow 75 at the edge of opening 74 points to the angle of setting and can b read from the indicated radiant line. This indicated angle of setting, either left or right, is calculated from the center point 61 between two adjustable guide blocks 76 and 77, which point is shown in phantom, inasmuch as it is an ascertainable, but imaginary point, since the base plate is cutaway. This allows the centerpoint of a hammer molding bore to be positioned at the point while its hammer shank is installed. A pair of wing nut and clutch plate assemblies 80 and 81 at opposite sides of the channel guide walls 63 and 64 are used to immobilize the channel 60 and to prevent rotation thereof. Each wing nut and clutch plate assembly 80 and 81 includes a plate 82 extending beneath the plates 55 and 56 and a bolt 83 fixed to the plate 82 and extending upwardly through the slot 59. A bell-shaped spring 84 serves as a clutch plate and fits over the bolt 83 and a wing nut 81 is threaded on the bolt 83 and is adapted to be turned down against the plate 82 and to hold the plate 82 securely against the hammer shank channel guide 60. With both assemblies 80 and 81 locked in place, and tightly against the channel guide 60, the channel guide is immobilized and cannot move. The opening 74 in the bottom of the shank channel guide 60, just forward of the arrow indicator 75 for the protractor degree setting, is designed to accomodate the protruding "bird's eye" end of the hammer shank's mounting flange, which is in a vertical position when the hammer shank is press-fitted into its hammer head bore.

A pair of hammer head guide blocks 76 and 77 are each affixed to an adjustable guide block mount and are spaced apart at the opening between guide block mounts 72 and 73 to permit proper positioning of a hammer head to be attached to a shank that is positioned in the hammer shank channel guide 60. The adjustable hammer head guide block mounts, and the adjustable hammer head guide blocks, together form a headstock assembly and are shown generally at 78.

Angle brackets 90 and 91 are fixed to the bottom of plate 51 and have adjustable guide walls 90*a* and 91*a*, respectively, projecting downwardly therefrom into the space between guide blocks 76 and 77. The other legs 90*b* and 91*b*, respectively, of the brackets are adjustably attached to the undersurface of plate 51 by bolts 90*c* and 91*c*, respectively.

The adjustable guide walls 90 and 91, position and hold the felt crown and side portions of the hammer head. The plates 51, 58, and 62, are recessed and angularly grooved at the plate 62 end to accomodate the felt circumflex portion of any size hammer head.

The press-rod block 68 is attached to rod 66 in conventional fashion using a snap ring 92, so that the rod 66 will turn in the press-rod block 68 and block 68 will reciprocate, while being held against rotation in the channel guide 60.

A hold down guide block 93 has a V-notch 93*a* formed on one end thereof and and a flat portion 93*b* on the other end thereof. The block 93 is adapted to fit between the upstanding walls 63 and 64 of the hammer shank guide 60. In use, after the hammer shank has been positioned within the channel guide 60, the hold down guide block is positioned with the V-groove portion centered over the round portion of the hammer shank and the flat portion of the block over the flat portion of the hammer shank. The hammer shank is thus centered and secured to the square in the channel guide 60.

A hammer head (not shown in the drawing) is positioned in the headstock with its tail projecting upwardly and the bore hole thereof is centrally positioned between the hammer head guide blocks. A headstock cover, shown generally at 95 includes a top cover 96, a rear wall 97, a front wall 98, and end walls 90, that terminate in notched feet 100. A cut out portion 101 in the cover 96 provides a window through which the user can observe positioning of the hammer head within the head stock cover. A set screw 102 is threaded through the front wall to position and hold the hammer head tail in place. Similarly a set screw 103, threaded through the rear wall is also adapted for use in counter-holding the hammer head tail in place. Such screws 104 and 105, threaded through the rear wall 106 of the headstock cover are adapted to engage the adjustable hammer head guide blocks 76 and 77 and to to secure the headstock cover in place. Front wall 98, is cut away as necessary at 108 to permit access to the adjustment screws for the headstock assembly.

A slot 110 in the top of the press-rod block opens into a tubular portion of the block and accommodates the drop screw of the hammer shank mounting flange when the hammer shank is positioned within the channel guide 60.

In the forefront of this tubular portion of the press-rod block an "allen" stop-screw (111) not visible in the drawing, is installed to prevent any "pushthrough" of the threaded rod 66 through the press-rod block 68.

The hammer head guide blocks (76 and 77) each have a forty-five degree cutout-portion from their inside bottom corners (112). This cutout-portion facilitates the angular placement and the simultaneous removal of the hammer shank and its hammer head after they have been set and glued together.

Although a preferred form of my invention has been herein disclosed, it is to be understood that the present disclosure is by way of example and that variations are possible without departing from the subject matter coming within the scope of the following claims, which subject matter I regard as my invention.

I claim:

1. A knuckle removal tool for removing knuckles from piano hammers comprising a shank holder having a shelf thereon, and a back extending from the shelf and said back having an opening therethrough;

a bifurcated lift blade having blade sections conveying from an outer end thereof and with inner edges increasing in thickness from the outer end;

means aligning the outer end of the blade with the opening in the back of the shank holder; and means for reciprocating the bifurcated blade closely over the shelf and in a path into and out of the opening.

2. A knuckle holder as in claim 1 wherein the means for driving the bifurcated blade comprises a blade carrier from which the blade projects;

a threaded rod extending freely through the blade carrier and threaded into the shank holder; and a handle fixed to the threaded rod at a side of the blade carrier opposite the shank holder, whereby rotation of the threaded rod will move the blade carrier and shank holder together.

3. A knuckle holder as in claim 2 wherein the means for driving the bifurcated blade comprises:

a compound leverage pliers, with a straight line jaw movement and with the blade projecting from one jaw and the shank holder carried by the other jaw.

* * * * *